(12) United States Patent
Molde et al.

(10) Patent No.: US 11,994,213 B2
(45) Date of Patent: May 28, 2024

(54) CONTINUOUSLY VARIABLE TRANSMISSION CLUTCH WITH A PEAK TORQUE LIMITER

(71) Applicant: TEAM Industries, Inc., Bagley, MN (US)

(72) Inventors: Stephen James Molde, Bemidji, MN (US); Alexander C. Yudell, Bemidji, MN (US); Bruce H. Younggren, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/178,359

(22) Filed: Mar. 3, 2023

(65) Prior Publication Data

US 2023/0279925 A1 Sep. 7, 2023

Related U.S. Application Data

(60) Provisional application No. 63/317,361, filed on Mar. 7, 2022.

(51) Int. Cl.
  *F16H 9/14* (2006.01)
  *B60K 17/344* (2006.01)
  *F16D 7/02* (2006.01)

(52) U.S. Cl.
  CPC ............ *F16H 9/14* (2013.01); *F16D 7/027* (2013.01); *B60K 17/344* (2013.01)

(58) Field of Classification Search
  CPC .... F16H 2061/6618; F16H 55/56; F16H 9/18; F16H 61/66272; F16H 9/14; F16D 7/027; B60K 17/344

USPC ............................................................. 474/8
See application file for complete search history.

(56) References Cited

U.S. PATENT DOCUMENTS

| | | | | | |
|---|---|---|---|---|---|
| 4,433,594 | A | * | 2/1984 | Smirl | F16H 37/021 474/18 |
| 4,881,925 | A | * | 11/1989 | Hattori | F16H 61/66263 474/18 |
| 5,006,092 | A | * | 4/1991 | Neuman | F16H 35/10 474/11 |
| 5,269,726 | A | * | 12/1993 | Swanson | F16H 63/065 474/30 |
| 5,310,384 | A | * | 5/1994 | Siemon | F16H 59/38 474/18 |
| 5,568,853 | A | * | 10/1996 | Adriaenssens | F16H 63/065 192/85.28 |
| 6,332,856 | B1 | * | 12/2001 | Iwamoto | B60K 17/08 474/18 |
| 6,716,129 | B2 | * | 4/2004 | Bott | F16H 55/56 475/116 |
| 8,002,653 | B2 | * | 8/2011 | Shiozaki | F02B 61/02 180/199 |

(Continued)

*Primary Examiner* — Henry Y Liu
(74) *Attorney, Agent, or Firm* — Fogg & Powers LLC

(57) ABSTRACT

A continuously variable transmission (CVT) clutch that includes a post, a fixed sheave, a moveable sheave and a peak torque limiter (PTL) is provided. The fixed sheave is rotationally mounted on the post. The fixed sheave is axially fixed in relation to the post. The moveable sheave is rotationally mounted on the post. The moveable sheave is configured to move axially on the post. The PTL operationally couples at least the moveable sheave to the post. The PTL is configured to slip when exposed to a torque over a set maximum toque threshold.

20 Claims, 9 Drawing Sheets

(56) References Cited

U.S. PATENT DOCUMENTS

| | | | | |
|---|---|---|---|---|
| 8,075,432 B2* | 12/2011 | Oishi | .................... | F16H 57/021 |
| | | | | 474/70 |
| 8,147,370 B2* | 4/2012 | Nakajima | ................ | F16H 57/04 |
| | | | | 475/210 |
| 11,485,225 B2* | 11/2022 | Younggren | ......... | F16H 61/6649 |
| 11,499,608 B2* | 11/2022 | Yudell | ................ | F16D 25/0638 |
| 11,543,006 B2* | 1/2023 | Yudell | ................ | F16D 25/0638 |
| 2004/0033851 A1* | 2/2004 | Lubben | ................... | F16C 25/06 |
| | | | | 474/144 |
| 2004/0077444 A1* | 4/2004 | Kanda | ................... | F16H 37/021 |
| | | | | 474/8 |
| 2004/0171443 A1* | 9/2004 | Borghi | ................... | F16D 43/08 |
| | | | | 474/12 |
| 2007/0082782 A1* | 4/2007 | Eguchi | ................... | F16H 59/14 |
| | | | | 477/77 |
| 2008/0268992 A1* | 10/2008 | Mitsubori | ............... | F02B 41/00 |
| | | | | 474/17 |
| 2015/0345570 A1* | 12/2015 | Tsukuda | .......... | B60W 30/18181 |
| | | | | 192/3.63 |
| 2018/0252315 A1* | 9/2018 | Rippelmeyer | .... | F16H 61/66272 |
| 2020/0400221 A1* | 12/2020 | Yudell | ..................... | F16D 25/14 |
| 2020/0400222 A1* | 12/2020 | Yudell | ..................... | F16D 7/027 |
| 2023/0011517 A1* | 1/2023 | Fisk | ........................ | F16H 61/66 |

* cited by examiner

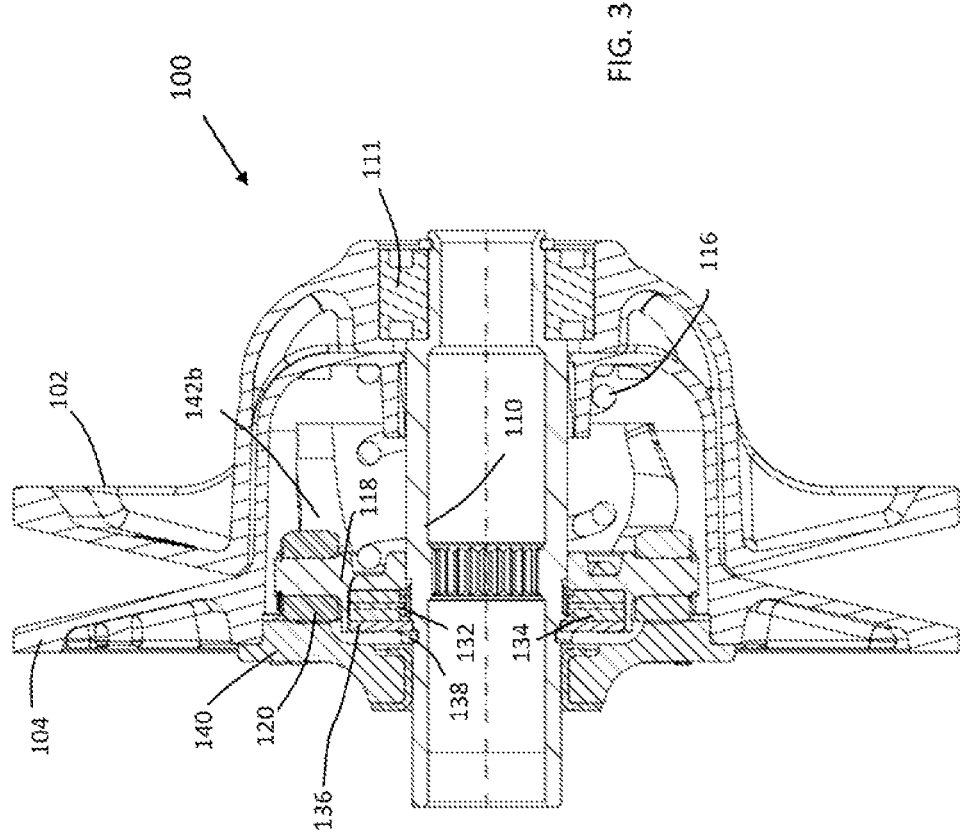

CONTINUOUSLY VARIABLE TRANSMISSION CLUTCH WITH A PEAK TORQUE LIMITER

CROSS-REFERENCE TO RELATED APPLICATIONS

This application claims priority to U.S. Provisional Application Ser. No. 63/317,361, same title herewith, filed on Mar. 7, 2022, which is incorporated in its entirety herein by reference.

BACKGROUND

A continuously variable transmission (CVT) includes a drive clutch (or primary clutch) and a driven clutch (or secondary clutch). The drive clutch is typically in rotational communication with an engine to receive engine torque and the driven clutch is in rotational communication with drivetrain of an associated vehicle. The driven clutch is in rotational communication with the drive clutch via endless loop member such as a belt. Both the drive clutch and driven clutch may include a movable sheave that is configured move axially on a post and a fixed sheave. The movable sheave axially moves on the post either away from or towards the fixed sheave based on RPM or applied torque. The belt, riding on faces of the fixed and movable sheave assemblies move radially either towards a central axis of the drive clutch or away from the central axis therein changing the gear ratio of the CVT.

In some applications, high inertial torque at the driven clutch may cause large down-stream torque spikes during power-on-landings and power-off-landings situations especially in off road vehicles. To address this inertial torque, downstream components are typically oversized relative to normal duty cycle loads. This design, however, adds additional costs and additional weight to vehicle.

For the reasons stated above and for other reasons stated below which will become apparent to those skilled in the art upon reading and understanding the present specification, there is a need in the art for a CVT system that handles torque spikes without requiring oversized components.

SUMMARY OF INVENTION

The following summary is made by way of example and not by way of limitation. It is merely provided to aid the reader in understanding some of the aspects of the subject matter described. Embodiments provide a CVT clutch with an internal peak torque limiter that allows downstream components to be sized for normal duty cycle loads.

In one embodiment, a CVT clutch that includes a post, a fixed sheave, a moveable sheave and a peak torque limiter (PTL) is provided. The fixed sheave is rotationally mounted on the post. The fixed sheave is axially fixed in relation to the post. The moveable sheave is rotationally mounted on the post. The moveable sheave is configured to move axially on the post. The PTL operationally couples at least the moveable sheave to the post. The PTL is configured to slip when exposed to a torque over a set maximum toque threshold.

In another embodiment, a CVT clutch is provided. The CVT includes a post, a fixed sheave, a movable sheave, a spider, a cam assembly, a PTL and a bias member. The fixed sheave is rotationally mounted on the post. The fixed sheave is axially fixed in relation to the post. The moveable sheave is rotationally mounted on the post. The moveable sheave is configured to move axially on the post. The spider is rotationally mounted on the post. The spider includes at least one roller. The spider is configured to move axially on the post. The cam assembly is coupled to the moveable sheave. The cam assembly includes cam profiles. At least one roller of the spider engages the cam profiles of the cam assembly to selectively move the moveable sheave axially in relation to the post based on an amount of toque present. The PTL including a clutch pack that operationally couples torque transfer between the spider and the post. The bias member is configured to exert a bias force on the spider to engage the clutch pack to allow the torque transfer between the spider and the post. The bias force provided by the bias member is selected to allow the clutch pack to slip when exposed to a torque over a set maximum toque threshold wherein the maximum toque threshold varies based on a then current ratio of a PTL torque over a cam assembly torque.

In still another embodiment, a vehicle is provided. The vehicle includes an engine to generate engine torque, a drivetrain configured to deliver the engine torque to wheels of the vehicle, and a CVT coupling the engine torque between the engine and the drivetrain. The CVT includes a drive CVT clutch in operational communication with the engine and driven CVT clutch sheave in operational communication with the drivetrain. The drive CVT clutch is in operational communication with the driven CVT clutch with an endless looped member. At least the driven CVT clutch includes a fixed sheave, a movable sheave, and a PTL. The fixed sheave is rotationally mounted on one of a post and input shaft. The fixed sheave is axially fixed in relation to the one of the post and input shaft. The moveable sheave is rotationally mounted on the one of the post and input shaft. The moveable sheave is configured to move axially on the one of the post and input shaft. The PTL is operationally coupling at least the moveable sheave to the one of the post and input shaft. The PTL is configured to slip when exposed to a torque over a set maximum toque threshold.

BRIEF DESCRIPTION OF THE DRAWINGS

The present invention can be more easily understood and further advantages and uses thereof will be more readily apparent, when considered in view of the detailed description and the following figures in which:

FIG. 3 is a side cross-sectional view of the CVT clutch of FIG. 1;

FIG. 9 is a block diagram of a vehicle employing a CVT clutch according to one exemplary aspect of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
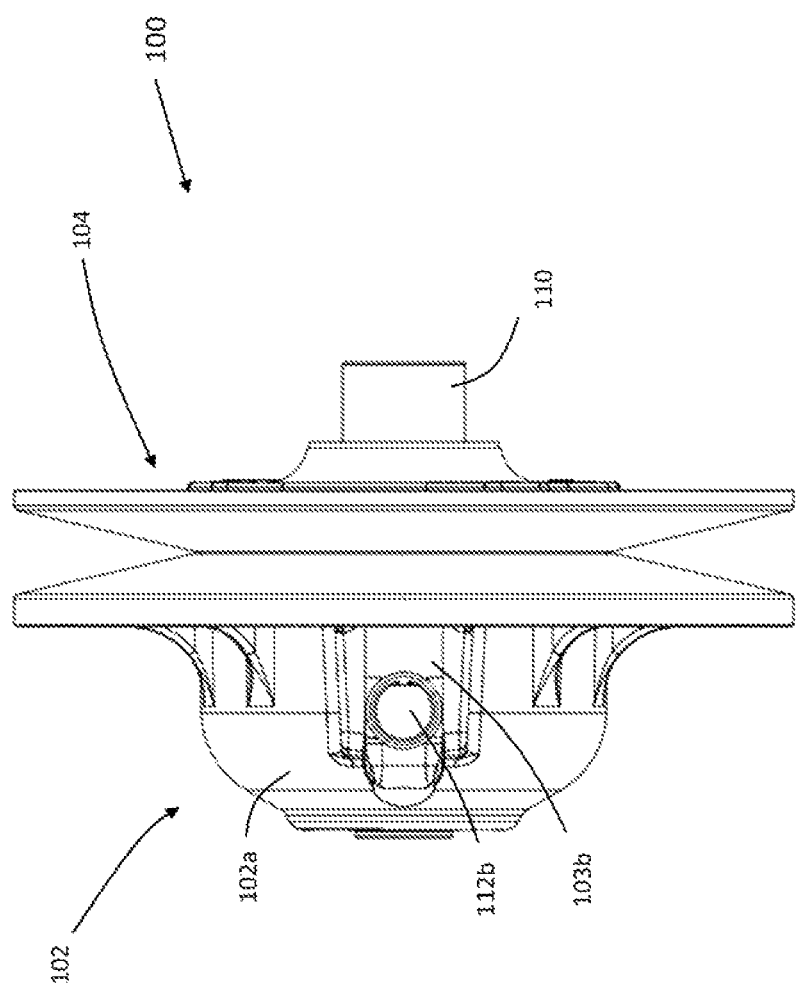
FIG. 1 is a side view of an assembled CVT clutch according to one exemplary embodiment.
Figure 2:
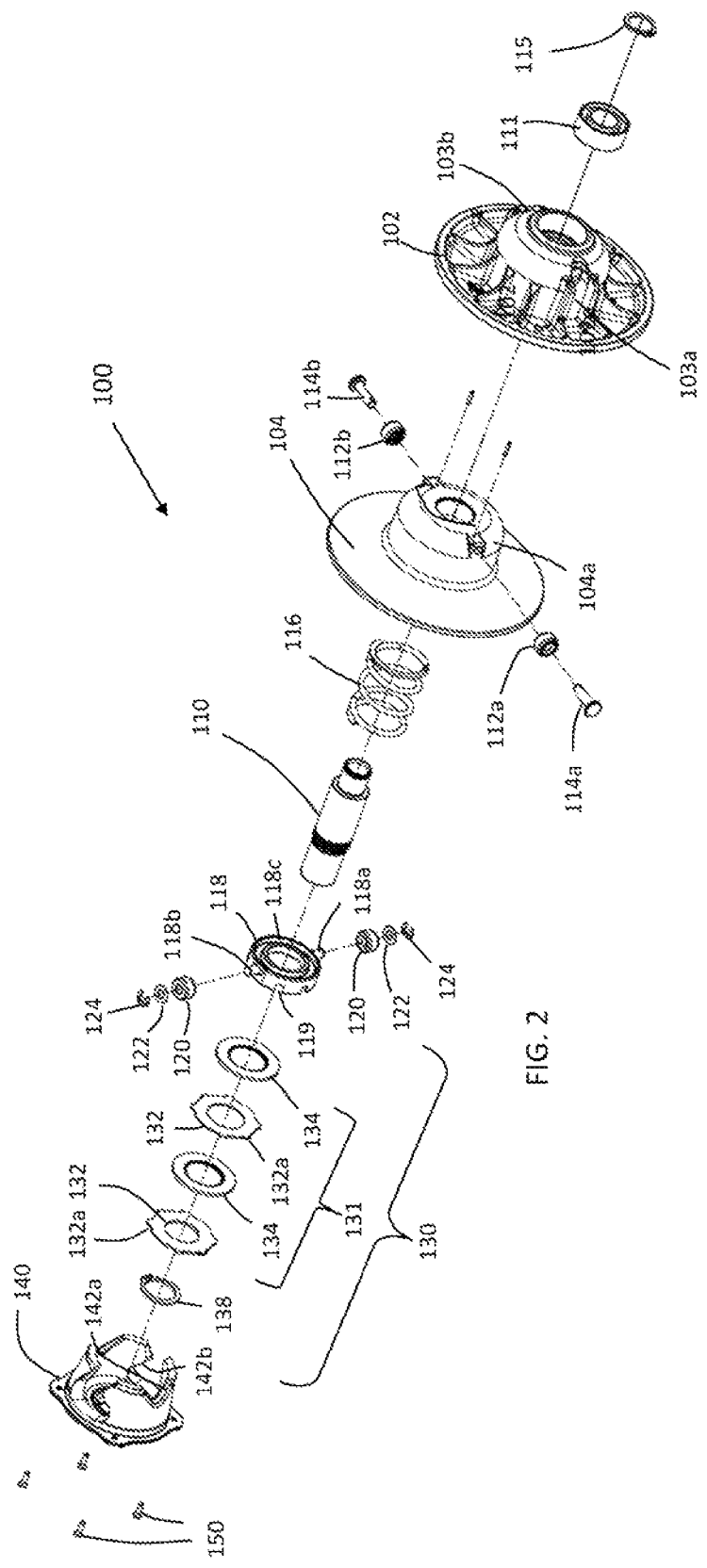
FIG. 2 is an unassembled side perspective view of the CVT clutch of FIG. 1.

Embodiments of the present invention provide a CVT clutch 100 with an integrated peak torque limiting assembly or peak torque limiter (PTL). FIG. 1 illustrates an assembled CVT clutch 100. The CVT clutch 100 includes a fixed sheave 102 and a movable sheave 104. An unassembled view of the CVT clutch 100 is further illustrated in FIG. 2. The CVT clutch 100 includes a post 110. On the post 110 is mounted the fixed sheave 102 and the movable sheave 104. The fixed sheave 102 is statically mounted on the post 110 via bearing 111 and retaining clip 115 so it cannot move axially in relation to the post 110. The movable sheave 104 is moveably mounted on the post 110 so it can move axially on the post 110 towards and away from the fixed sheave 102.

In the example embodiment illustrated, the fixed sheave 102 and the movable sheave 104 are tied together to prevent belt smear with a pair of tied rollers 112a and 112b that are opposably mounted on a hub 104a of the movable sheave 104 via fastening post members 114a and 114b. In this design, the tied rollers 112a and 112b are received in tied slots 103a and 103b in hub 102a of the fixed sheave 102 to prevent relative rotation between the fixed sheave 102 and the movable sheave 104.

Received in the movable sheave hub 104a is a bias member 116 that is positioned between an inside surface of hub 104a and a spider 118. The bias member 116 exerts a force between the spider 118 and the hub 104a of the movable sheave 104. The spider 118, in this example, includes a pair of radially extending and opposably positioned spider posts 118a and 118b. A roller 120 is rotationally mounted on each spider post 118a and 118b with a washer 122 and retaining clip 124.

The CVT clutch 100 further includes a PTL 130. The PTL 130 includes a clutch pack having a plurality of alternating spider reaction plates 132 and post friction plates 134. The spider reaction plates 132 include radially extending tabs 132a that are received in slots 119 of a base 118c of the spider 118 in this example. This tab/slot arrangement couples torque between the spider reaction plates 132 and the spider 118. The post friction plates 134 are coupled to the post 110 to couple torque between the post 110 and the post friction plates 134. A thrust plate 136 (best illustrated in FIG. 3) and retaining clip 138 mounted on the post 110 engage one side of the alternating arranged spider reaction plates 132 and post friction plates 134. A force provided by the bias member 116 engaging the spider 118 provides a select amount of force on the PTL 130 so that under normal operating conditions torque flows though the spider 118 to the post 110. However, when torque exceeds a predetermined maximum, slippage occurs between the spider reaction plates 132 and the post friction plates 134 so torque is not transferred between the spider and the post 110. This protects driveline components from large torque spikes.

The CVT clutch 100 further includes a cam assembly 140. The cam assembly 140 includes cam profiles 142a and 142b in which the rollers 120 of the spider 118 engage. As the torque through the spider 118 (which has limited axially motion in relation to the post 110 to exert a force on the post friction plates 134 and the spider reaction plates 132) increases or decreases, the rollers 120 engaging the cam profiles, move the cam assembly 140 (which is coupled to the moveable sheave 104 via fasteners 150) towards and away from the fixed sheave 102 to adjust the gearing of the CVT clutch 100. In an example, the fixed sheave 102, movable sheave 104, cam assembly 140 and spider 118 all are free to rotate in relation to the post 110.

The cam assembly/spider arrangement is part of a movable sheave assembly that, in this example, provides a torque sensitive CVT clutch 100. The PTL 130 is further a torque sensing member that connects the post 110 to the cam assembly 140. Since the reaction force of the cam assembly 140 goes through the PTL 130, a torque loop occurs. Meaning as the CVT clutch 100 shifts through its ratios, the capacity of the PTL 130 will build exponentially. However, during derivation of the mechanism forces, a point at which an increase in spider force stops adding to the torque capacity of the PTL 130 occurs. At this point, any additional torque seen by the PTL 130 causes the PTL 130 to slip. This maximum torque point may be referenced as $\tau_{critical}$.

Figure 4A:
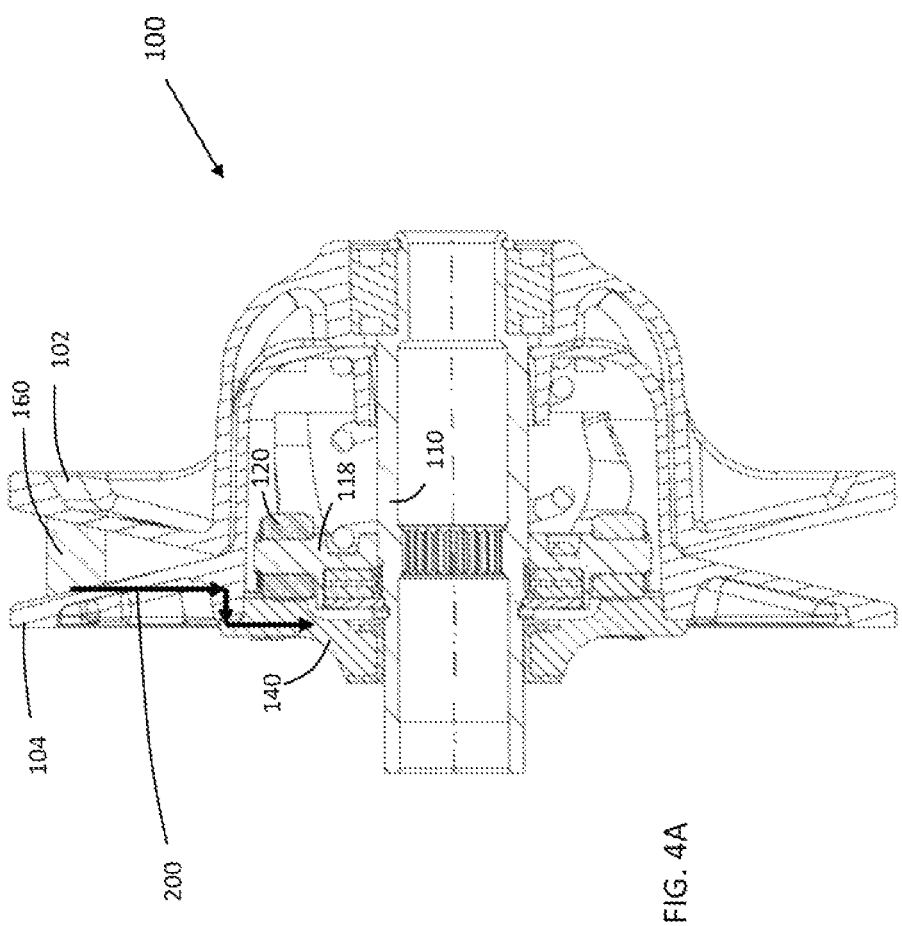
FIG. 4A is another side cross-sectional view of the CVT clutch of FIG. 1 illustrating a torque path.
Figure 4B:
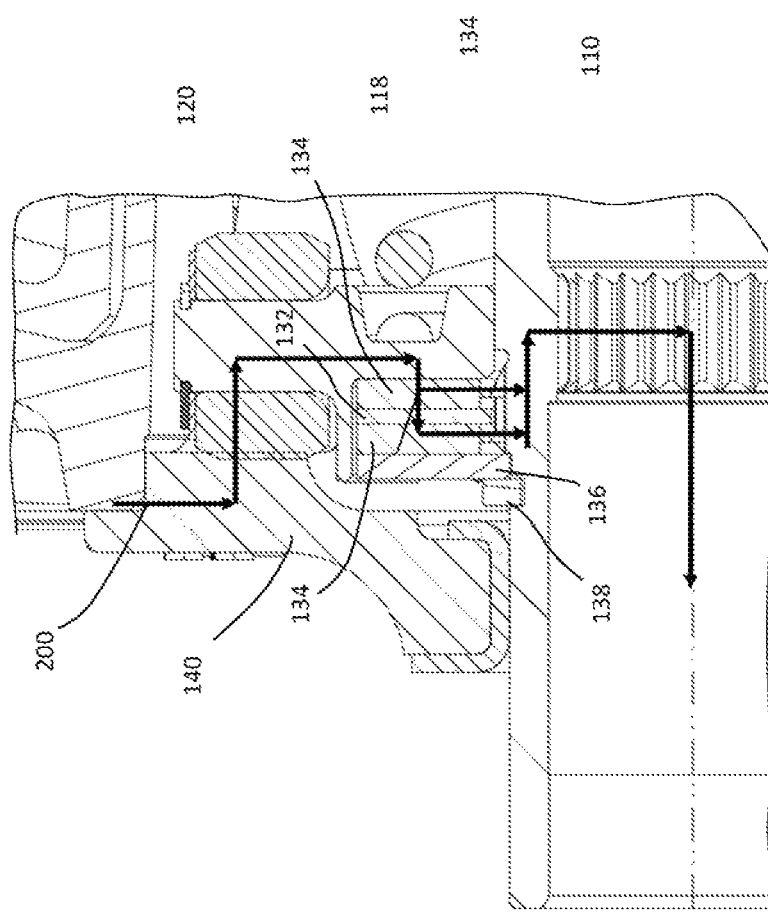
FIG. 4B is a close up-side cross-sectional side view of the CVT clutch of FIG. 1 further highlighting the torque path.

FIG. 3 illustrates a cross-sectional side view of the CVT clutch 100. In FIG. 3, the bias member 116, positioned between the spider 118 and an inside end of the hub 104a of the movable sheave 104, is biasing the movable sheave 104 towards the fixed sheave 102. FIG. 4A illustrates the cross-sectional side view of the CVT clutch 100 illustrating an engine torque flow path 200. The CVT clutch 100 in this example is a driven clutch where engine torque from a drive clutch is provided to the driven clutch via belt 160. As illustrated, the torque in this example comes in from belt 160 (or other type of endless loop member) that is engaged with engagement faces of the respective fixed and movable sheaves 102 and 104. The torque path 200 passes into the cam assembly 140. Further as illustrated in the close-up view of FIG. 4B, the torque path passes from the cam assembly 140 to the rollers 120 to the spider 118. From there, the torque, if not greater than the set maximum torque (or $\tau_{critical}$), is passed through the spider reaction plates 132 to the post friction plates 134 to the post 110. From there the torque is coupled to drivetrain components (not shown).

Torque may further travel from the drivetrain components (not shown) through the CVT clutch 100 during situations where the drivetrain is trying to overrun the CVT. The drivetrain components may include, but are not limited to, gear boxes, prop shafts, differentials, half shafts, wheels, tires, tracks, etc. An example of a situation where torque travels from the drivetrain components through the CVT clutch 100 is when a vehicle is traveling down a hill while a throttle of a vehicle is at idle. Another example of when torque may travel from the drivetrain to the CVT clutch 100 is when the vehicle lands after completing a jump. This situation may result in a torque spike passing through the drivetrain and CVT. An example of torque traveling from the drivetrain through the CVT clutch 100 is illustrated in FIG. 5.

Figure 5:
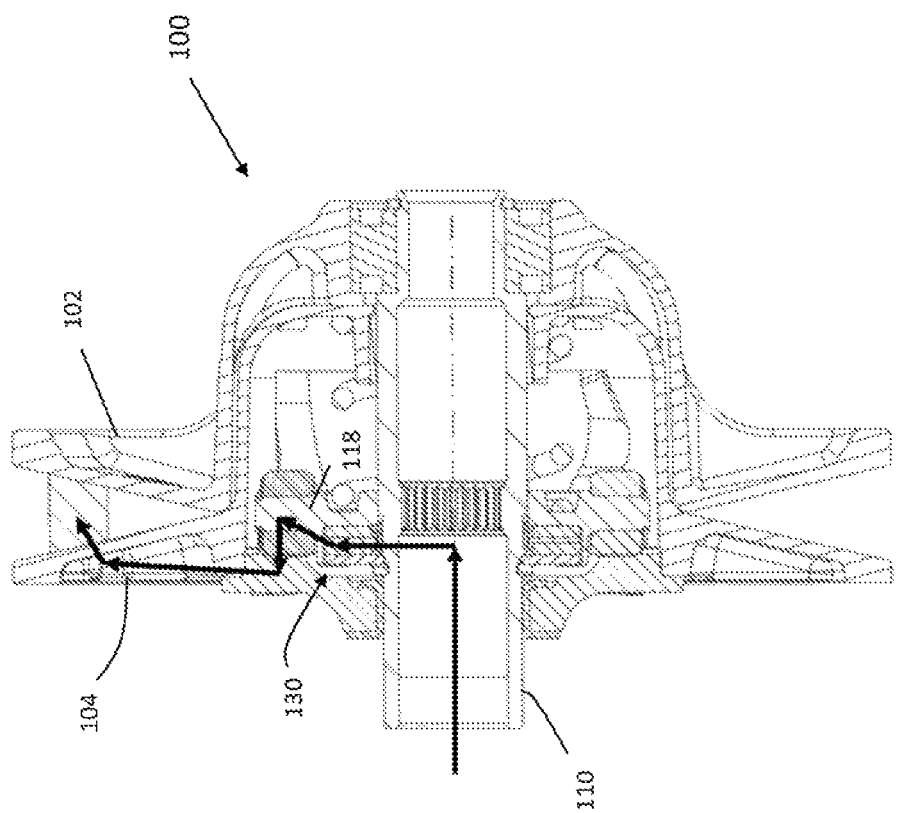
FIG. 5 is side cross-sectional view of the CVT clutch of FIG. 1 illustrating a torque path in an opposite direction.

As illustrated in FIG. 5, the torque enters the CVT clutch 100 from the drivetrain through the post 110. From there, the torque travels through the PTL 130 to the spider 118. If the torque is above the maximum threshold, the PTL 130 will slip therein not allowing the torque spike to pass through the CVT clutch 100. From the spider 118 the torque passes through the cam assembly 140 to the movable sheave 104 to the belt. As discussed, if a torque spike is encountered that is greater than the set maximum of the PTL 130, the plates 132 and 134 of the clutch pack 131 of the PTL 130 will slip therein not allowing the torque spike to pass through the CVT clutch 100. Although, the CVT clutch 100 is described as a driven clutch, in another example a drive clutch of a CVT can include a PTL 130 to prevent torque above a maximum threshold from passing through the drive clutch of the CVT.

Figure 6:
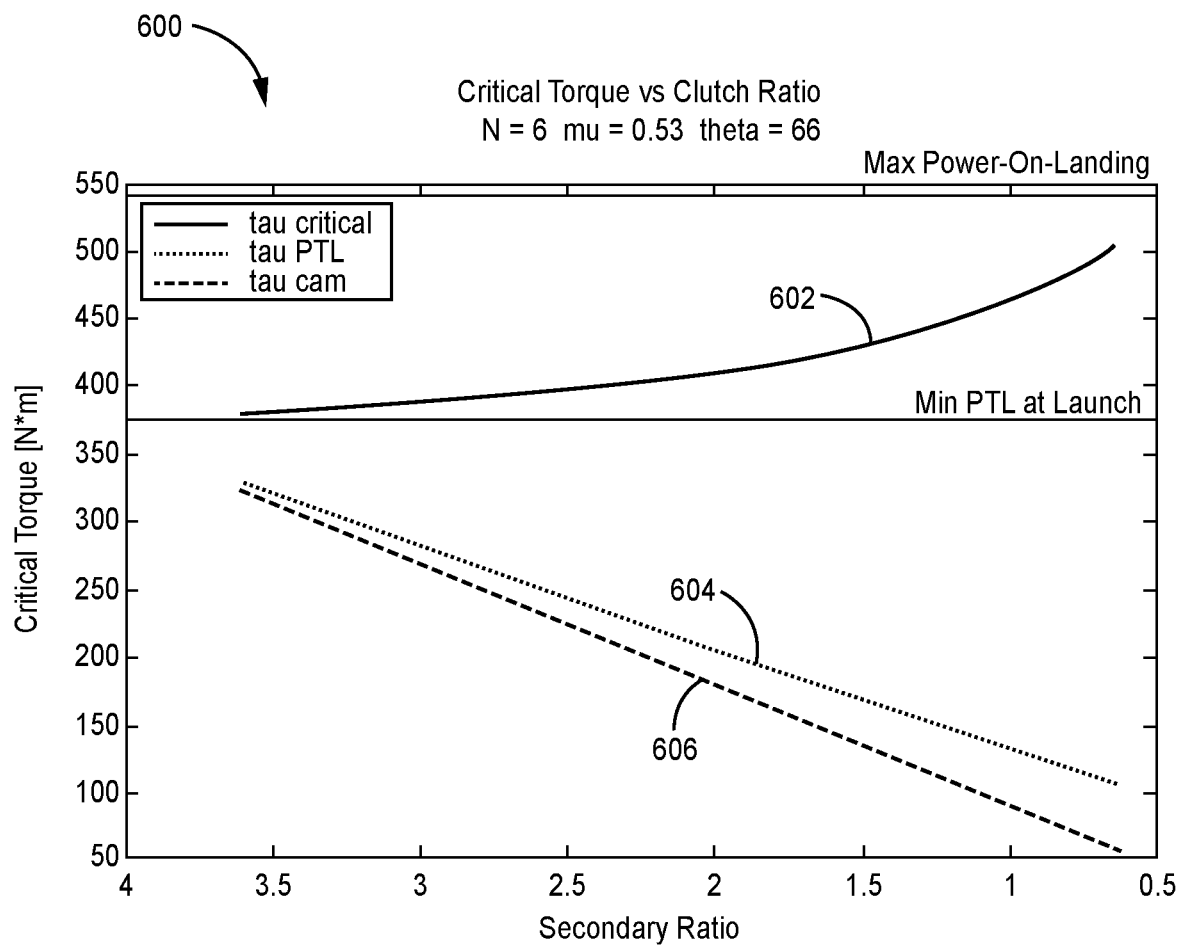
FIG. 6 is a critical torque vs clutch ratio graph according to one exemplary embodiment.

In reference to the critical torque vs clutch ratio graph 600 of FIG. 6, the rate of change in $\tau_{critical}$ is caused by the difference in magnitude of a normal PTL torque capacity and an engine driven torque on the cam assembly 140, $\Delta_r$. Illustrated in Graph 600 is the critical torque 602 ($\tau_{critical}$), torque at the PTL 604 and torque at the cam assembly 606. In the configuration of the CVT clutch 100 (secondary clutch 100 in this example), as the CVT clutch 100 shifts from a low ratio to a high ratio, the normal torque between the cam assembly 140 and the PTL 130 diverge as illustrated.

Figure 7:
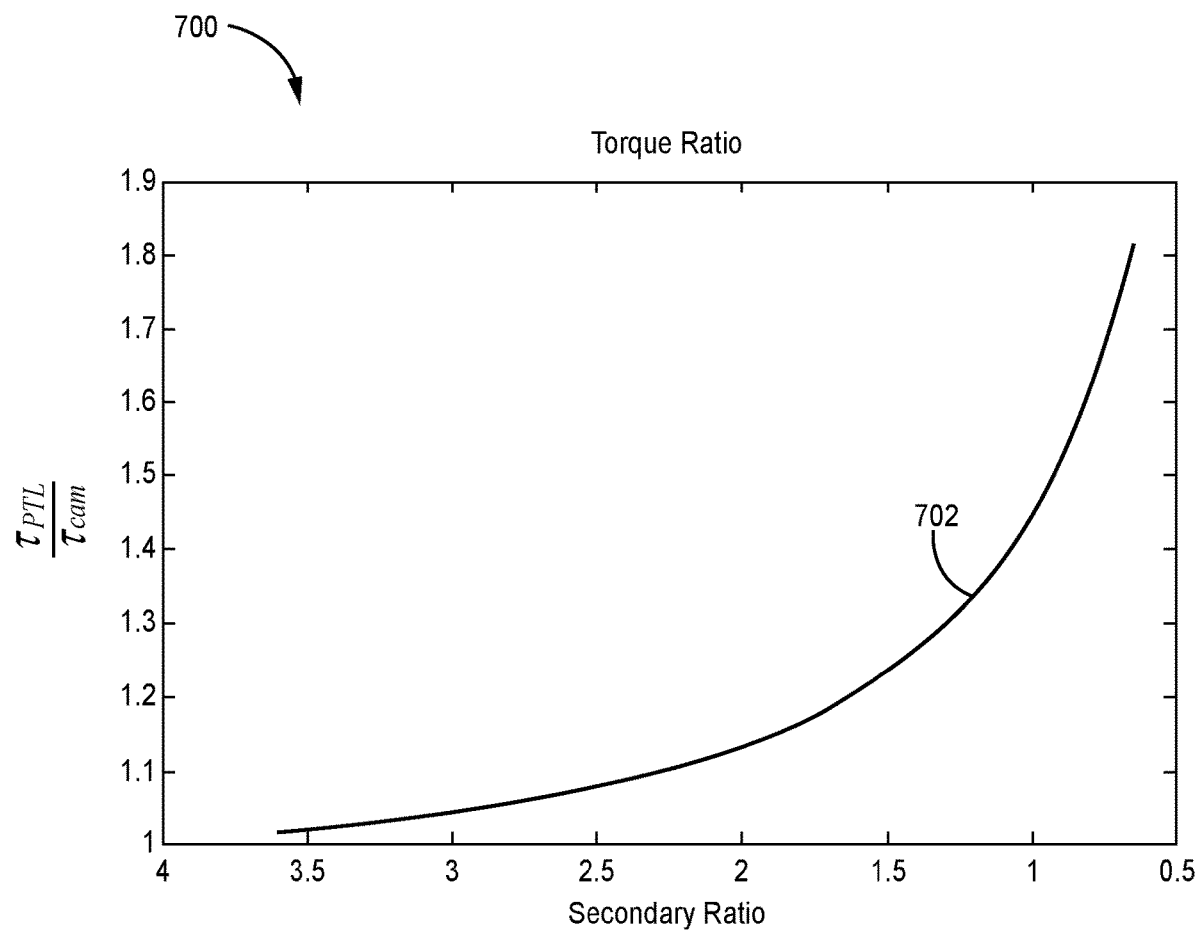
FIG. 7 is a torque verses secondary clutch ratio graph according to one exemplary embodiment.

The magnitude of the torque point, $\tau_{critical}$ increases with the torque ratio between the PTL 130 and the cam assembly 140. That is, the torque ratio, in this example, between PTL 130 and the cam assembly 140 continues to rise as the CVT clutch 100 shifts from low to high ratio as illustrated in the torque ratio curve 702 of the torque verses secondary clutch ratio graph 700 of FIG. 7.

A desired operating characteristic of the CVT clutch 100 can be adjusted by changing the stiffness of the main bias member 116 exerting a force on the PTL 130 through the spider 118 or by increasing or decreasing friction in the PTL 130. On method of increasing or decreasing friction is by adding or removing plates 132 and 134.

Figure 8A:
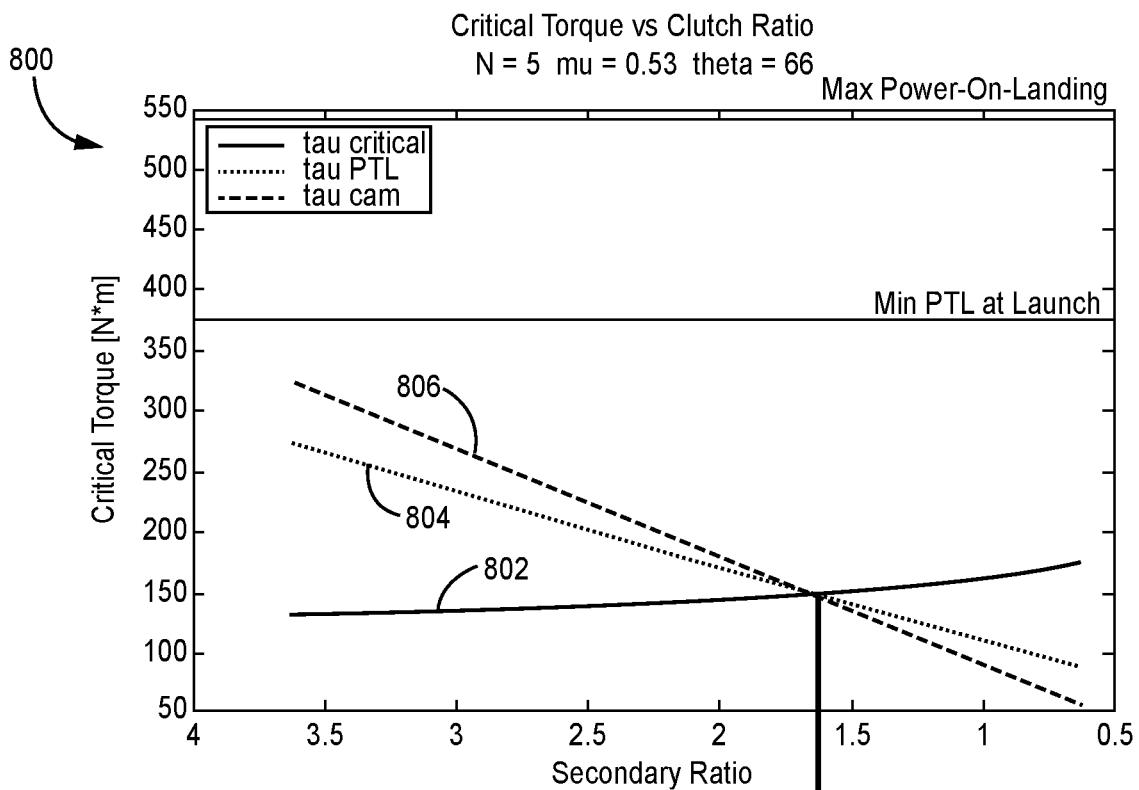
FIG. 8A is a critical torque verses clutch ratio graph according to one exemplary embodiment.

The critical torque verses clutch ratio graph 800 of FIG. 8A illustrates a critical torque 802 ($\tau_{critical}$), torque at the PTL 804 and torque at the cam assembly 806. Graph 8A illustrates an example of a removal of a friction surface (one of the plates 132 and 134 of the PTL 130) and its effect. In this example, there was originally 6 surfaces and now there is only 5 surfaces. The torque on the cam assembly 140 becomes larger that the torque capacity of the PTL 130 in low ratio. $\tau_{critical}$ is lower than the torque on the cam assembly 140. This design should slip until $\tau_{critical}=1$.

$\tau_{critical}$, in an example, is determined by the equation:

$$\tau_{critical} = \frac{\alpha F_s}{1 - \alpha\beta}$$

Where $F_s$ is the force of the compression spring (main bias member 116), $\alpha$ is a constant whose value is equal to $\mu r_{PTL} N$ and $\beta$ is a constant whose value is equal to $$\frac{1}{r_c \tan\theta}.$$

Figure 8B:
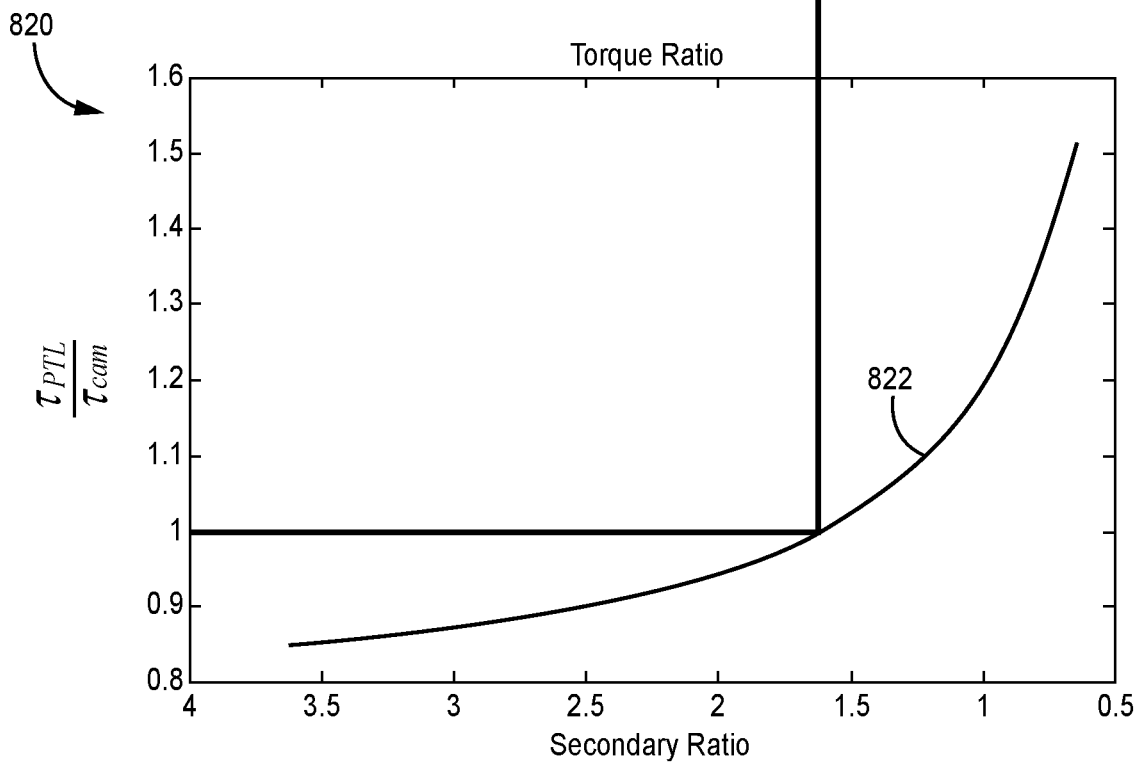
FIG. 8B is a torque verses secondary clutch ratio graph according to one exemplary embodiment.

As the secondary ratio becomes <1.6, $\tau_{critical}$ slowly rises as the cam torque and PTL torque begin to diverge. When this happens the rate of change for $\tau_{critical}$ also begins to increase. The magnitude of $\tau_{critical}$ is directly related to the magnitude of the difference between cam torque and PTL torque. This relationship can be seen in the torque ratio curve 822 of torque ratio graph 820 of FIG. 8B. The Y axis is the ratio, PTL torque/cam torque.

In another example, a CVT clutch is provided that includes a PTL with a present torque slipping value that remains constant. In this example, a spider/cam assembly may not be used as a reaction force as discussed above. The PTL in this example operationally couples at least the movable sheave to the post. The PTL is configured to slip when exposed to a torque over a constant set maximum toque threshold.

Further, in another example, the PTL is applied to a CVT clutch that does not include a traditional CVT post of a CVT clutch. This type of CVT clutch may be directly mounted on an input shaft, such as a transmission input shaft. Hence, the post 110 may be an input shaft in an example. One example method of conveying torque between the movable sheave and fixed sheave and the input shaft is with the use of a spider that includes an inner passage with splines that are designed to engage splines on the input shaft. In one example, the PTL may be incorporated in the spider. In another related example, the PTL may be a separate member that is positioned between the spider and the input shaft. In this example, the PTL may include coupling features designed to engage both the input shaft and spider. Hence, embodiments are not limited to CVT clutches with posts. Further, CVT clutches that incorporate other types of movable sheave assemblies that provide axially movement between the fixed sheave and movable sheave may implement a PTL as described above. In these additional types of CVT clutches, the PTL is positioned within the CVT clutch to prevent torque spikes above a set maximum torque threshold being communicated or transferred between the fixed and movable sheaves and a post or input shaft.

Referring to block diagram of FIG. 9, an example vehicle 900 implementing a CVT clutch 100 described above is illustrated. The CVT clutch 100 is part of a CVT 904 that further includes an endless looped member 911 (that may be a belt) and a drive clutch 906. The drive clutch 906 of the CVT 904 is in operational communication with an engine 902 to receive engine torque. The CVT clutch 100, which is a driven clutch in this example, is in operational communication with the drive clutch 906 via the endless looped member 911 to selectively communicate torque between the drive clutch 906 and the CVT clutch 100 (driven clutch). The driven clutch in this example, includes the PTL 130 as described above to prevent unwanted torque spikes from traveling from a drivetrain 907 through the CVT 904.

The driven clutch 906 is in communication with the drivetrain 907 that, in this example, includes a transmission gear box 908. The CVT clutch 100 (driven clutch in this example) is in communication with the transmission gear box via input shaft such as, for example, a transmission input shaft. The drivetrain 907 in this example further includes a rear differential 916 that is in operational communication with the gear box 908 via rear prop shaft 912. The rear differential 916 is in operational communication with rear wheels 924a and 924b via respective rear half shafts 922a and 922b.

Further in this example, the drivetrain 907 of the vehicle 900 includes a front differential 914 that is in operational communication with the gear box 908 via front prop shaft 910. The front differential is in communication with the front wheels 920a and 920b via front half shafts 918a and 918b.

Other vehicle configurations may use the CVT clutch 100 described above including, tracked vehicles, as well as any other type of vehicle that employs a CVT system where there is a desire to mitigate torque spikes.

Example Embodiments

Example 1 includes a CVT clutch. The CVT clutch includes a post, a fixed sheave, a movable sheave and a PTL. The fixed sheave is rotationally mounted on the post. The fixed sheave is axially fixed in relation to the post. The moveable sheave is rotationally mounted on the post. The moveable sheave is configured to move axially on the post. The PTL operationally couples at least the moveable sheave to the post. The PTL is configured to slip when exposed to a torque over a set maximum toque threshold.

Example 2 includes the CVT clutch of example 1, further including a spider and cam assembly. The spider is rotationally mounted on the post. The spider includes at least one roller. The cam assembly is coupled to the moveable sheave. The cam assembly includes cam profiles in which the at least one roller of the spider engage to selectively move the moveable sheave axially in relation to the post based on an amount of toque. The PTL couples the spider to the post.

Example 3, includes the CVT clutch of Example 2, where the PTL further includes a plurality of spider reaction plates coupled to the spider and a plurality of post friction plates coupled to the post. The plurality of spider reaction plates and the plurality of post friction plates are positioned in an alternating arrangement. A bias member is configured to exert a bias force on the alternating arrangement of the plurality of spider reaction plates and the plurality of the post friction plates to allow torque transfer between the plurality of spider reaction plates and the plurality of the post friction plates.

Example 4 includes the CVT clutch of Example 3, wherein each spider reaction plate includes a plurality of radially extending tabs, each radially extending tab configured to be received within a slot in a base of the spider to couple rotation of each spider reaction plate with the rotation of the spider.

Example 5 includes the CVT clutch of Example 3, further including thrust plate and retaining clip. The thrust plate is positioned to engage the alternating arrangement of the plurality of spider reaction plates and plurality of post friction plates. The retaining clip engages the thrust plate and the post to position the thrust plate to engage the alternating arrangement of the plurality of spider reaction plates and plurality of post friction plates.

Example 6 includes the CVT clutch of any of the Examples 3-5, wherein the spider is positioned between the bias member and the alternating arrangement of the plurality of spider reaction plates and plurality of the post friction plates.

Example 7 includes the CVT clutch of any of the examples 1-6, wherein the maximum toque threshold of the PTL varies based on a then current ratio of PTL torque over cam assembly torque.

Example 8 include the CVT clutch of any of the examples 1-7, wherein the post is one of a CVT post of the CVT clutch and an input shaft.

Example 9 includes the CVT clutch of Example 8, where the input shaft is a transmission input shaft.

Example 10 includes a CVT clutch including a post, a fixed sheave, a movable sheave, a spider, a cam assembly, a PTL and a bias member. The fixed sheave is rotationally mounted on the post. The fixed sheave is axially fixed in relation to the post. The moveable sheave is rotationally mounted on the post. The moveable sheave is configured to move axially on the post. The spider is rotationally mounted on the post. The spider includes at least one roller. The spider is configured to move axially on the post. The cam assembly is coupled to the moveable sheave. The cam assembly includes cam profiles. The at least one roller of the spider engages the cam profiles of the cam assembly to selectively move the moveable sheave axially in relation to the post based on an amount of toque present. The PTL including a clutch pack that operationally couples torque transfer between the spider and the post. The bias member is configured to exert a bias force on the spider to engage the clutch pack to allow the torque transfer between the spider and the post. The bias force provided by the bias member is selected to allow the clutch pack to slip when exposed to a torque over a set maximum toque threshold wherein the maximum toque threshold varies based on a then current ratio of a PTL torque over a cam assembly torque.

Example 11 includes the CVT clutch of Example 10, wherein the clutch pack further includes a plurality of spider reaction plates coupled to the spider and a plurality of post friction plates coupled to the post. The plurality of spider reaction plates and the plurality of post friction plates are positioned in an alternating arrangement.

Example 12 includes the CVT clutch of Example 11, wherein each spider reaction plate includes a plurality of radially extending tabs. Each radially extending tab is configured to be received within a slot in a base of the spider to couple rotation of each spider reaction plate with the rotation of the spider.

Example 13 includes the CVT clutch of any of the Example 11-12, further including a thrust plate and retaining clip. The thrust plate positioned to engage the alternating arrangement of the plurality of spider reaction plates and plurality of post friction plates. The retaining clip engaging the thrust plate and the post to position the thrust plate to engage the alternating arrangement of the plurality of spider reaction plates and plurality of post friction plates.

Example 14 includes the CVT clutch of any of the Examples 11-13, wherein the spider is positioned between the bias member and the alternating arrangement of the plurality of spider reaction plates and plurality of the post friction plates.

Example 15 includes the CVT clutch of any of the Examples 10-14, wherein the post is one of a CVT post of the CVT clutch and an input shaft.

Example 16 includes the CVT clutch of Example 15, wherein the input shaft is a transmission input shaft.

Example 17 include a vehicle. The vehicle including an engine to generate engine torque, a drivetrain configured to deliver the engine torque to wheels of the vehicle, and a CVT coupling the engine torque between the engine and the drivetrain. The CVT includes a drive CVT clutch in operational communication with the engine and driven CVT clutch sheave in operational communication with the drivetrain. The drive CVT clutch is in operational communication with the drive CVT clutch with an endless looped member. At least the driven CVT clutch includes a fixed sheave, a movable sheave, and a PTL. The fixed sheave is rotationally mounted on one of a post and input shaft. The fixed sheave is axially fixed in relation to the one of the post and input shaft. The moveable sheave is rotationally mounted on the one of the post and input shaft. The moveable sheave is configured to move axially on the one of the post and input shaft. The PTL is operationally coupling at least the movable sheave to the one of the post and input shaft. The PTL is configured to slip when exposed to a torque over a set maximum toque threshold.

Example 18 include the vehicle of Example 17, further including a spider and a cam assembly. The spider is rotationally mounted on the one of the post and input shaft. The PTL coupling the spider to the one of the post and input shaft. The PTL configured to slip when exposed to a torque over a set maximum toque threshold. The spider includes at least one roller. The cam assembly is coupled to the moveable sheave. The cam assembly includes cam profiles. The at least one roller of the spider engages the cam profiles of the cam assembly to selectively move the moveable sheave axially in relation to the post based on an amount of toque.

Example 19 includes the vehicle of Example 18, wherein the PTL further includes a plurality of spider reaction plates, a plurality of post friction plates and a bias member. The plurality of spider reaction plates are coupled to the spider. The plurality of post friction plates are coupled to the one of the post and input shaft. The plurality of spider reaction plates and the plurality of post friction plates are positioned in an alternating arrangement. The bias member is configured to exert a bias force on the alternating arrangement of the plurality of spider reaction plates and plurality of the post friction plates to allow torque transfer between the plurality of spider reaction plates and the plurality of the post friction plates.

Example 20 includes the vehicle of any of the Examples 18-19 wherein the maximum toque threshold of the PTL varies based on a then current ratio of PTL torque over cam assembly torque.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously variable transmission (CVT) clutch, the CVT clutch comprising:
    a post;
    a fixed sheave rotationally mounted on the post, the fixed sheave axially fixed in relation to the post;
    a moveable sheave rotationally mounted on the post, the moveable sheave configured to move axially on the post; and
    a peak torque limiter (PTL) operationally coupling at least the moveable sheave to the post, the PTL configured to slip when exposed to a torque over a set maximum toque threshold.

2. The CVT clutch of claim 1, further comprising:
    a spider rotationally mounted on the post, the spider including at least one roller;
    a cam assembly coupled to the moveable sheave, the cam assembly including cam profiles, the at least one roller of the spider engaging the cam profiles of the cam assembly to selectively move the moveable sheave axially in relation to the post based on an amount of toque; and
    the peak torque limiter (PTL) coupling the spider to the post.

3. The CVT clutch of claim 2, where the PTL further comprises:
    a plurality of spider reaction plates coupled to the spider;
    a plurality of post friction plates coupled to the post, the plurality of spider reaction plates and the plurality of post friction plates positioned in an alternating arrangement; and
    a bias member configured to exert a bias force on the alternating arrangement of the plurality of spider reaction plates and the plurality of the post friction plates to allow torque transfer between the plurality of spider reaction plates and the plurality of the post friction plates.

4. The CVT clutch of claim 3, wherein each spider reaction plate includes a plurality of radially extending tabs, each radially extending tab configured to be received within a slot in a base of the spider to couple rotation of each spider reaction plate with the rotation of the spider.

5. The CVT clutch of claim 3, further comprising:
    a thrust plate positioned to engage the alternating arrangement of the plurality of spider reaction plates and plurality of post friction plates; and
    a retaining clip engaging the thrust plate and the post to position the thrust plate to engage the alternating arrangement of the plurality of spider reaction plates and plurality of post friction plates.

6. The CVT clutch of claim 3, wherein the spider is positioned between the bias member and the alternating arrangement of the plurality of spider reaction plates and plurality of the post friction plates.

7. The CVT clutch of claim 1, wherein the maximum toque threshold of the PTL varies based on a then current ratio of PTL torque over cam assembly torque.

8. The CVT clutch of claim 1, wherein the post is one of a CVT post of the CVT clutch and an input shaft.

9. The CVT clutch of claim 8, where the input shaft is a transmission input shaft.

10. A continuously variable transmission (CVT) clutch, the CVT clutch comprising:
    a post;
    a fixed sheave rotationally mounted on the post, the fixed sheave axially fixed in relation to the post;
    a moveable sheave rotationally mounted on the post, the moveable sheave configured to move axially on the post;
    a spider rotationally mounted on the post, the spider including at least one roller, the spider configured to move axially on the post;
    a cam assembly coupled to the moveable sheave, the cam assembly including cam profiles, the at least one roller of the spider engaging the cam profiles of the cam assembly to selectively move the moveable sheave axially in relation to the post based on an amount of toque present;
    a peak torque limiter (PTL) including a clutch pack that operationally couples torque transfer between the spider and the post; and
    a bias member configured to exert a bias force on the spider to engage the clutch pack to allow the torque transfer between the spider and the post, the bias force provided by the bias member selected to allow the clutch pack to slip when exposed to a torque over a set maximum toque threshold, wherein the maximum toque threshold varies based on a then current ratio of a PTL torque over a cam assembly torque.

11. The CVT clutch of claim 10, wherein the clutch pack further comprises:
    a plurality of spider reaction plates coupled to the spider; and a plurality of post friction plates coupled to the post, the plurality of spider reaction plates and the plurality of post friction plates positioned in an alternating arrangement.

12. The CVT clutch of claim 11, wherein each spider reaction plate includes a plurality of radially extending tabs, each radially extending tab configured to be received within a slot in a base of the spider to couple rotation of each spider reaction plate with the rotation of the spider.

13. The CVT clutch of claim 11, further comprising:
a thrust plate positioned to engage the alternating arrangement of the plurality of spider reaction plates and plurality of post friction plates; and
a retaining clip engaging the thrust plate and the post to position the thrust plate to engage the alternating arrangement of the plurality of spider reaction plates and plurality of post friction plates.

14. The CVT clutch of claim 11, wherein the spider is positioned between the bias member and the alternating arrangement of the plurality of spider reaction plates and plurality of the post friction plates.

15. The CVT clutch of claim 10, wherein the post is one of a CVT post of the CVT clutch and an input shaft.

16. The CVT clutch of claim 15, wherein the input shaft is a transmission input shaft.

17. A vehicle comprising:
an engine to generate engine torque:
a drivetrain configured to deliver the engine torque to wheels of the vehicle; and
a continuously variable transmission (CVT) coupling the engine torque between the engine and the drivetrain, the CVT including a drive CVT clutch in operational communication with the engine and driven CVT clutch sheave in operational communication with the drivetrain, the drive CVT clutch in operational communication with the drive CVT clutch with an endless looped member, at least the driven CVT clutch including,
a fixed sheave rotationally mounted on one of a post and input shaft, the fixed sheave axially fixed in relation to the one of the post and input shaft;
a moveable sheave rotationally mounted on the one of the post and input shaft, the moveable sheave configured to move axially on the one of the post and input shaft; and
a peak torque limiter (PTL) operationally coupling at least the moveable sheave to the one of the post and input shaft, the PTL configured to slip when exposed to a torque over a set maximum toque threshold.

18. The vehicle of claim 17, further comprising:
a spider rotationally mounted on the one of the post and the input shaft, the PTL coupling the spider to the one of the post and input shaft, the PTL configured to slip when exposed to a torque over a set maximum toque threshold, the spider including at least one roller; and
a cam assembly coupled to the moveable sheave, the cam assembly including cam profiles, the at least one roller of the spider engaging the cam profiles of the cam assembly to selectively move the moveable sheave axially in relation to the post based on an amount of toque.

19. The vehicle of claim 18, where the PTL further comprises:
a plurality of spider reaction plates coupled to the spider;
a plurality of post friction plates coupled to the one of the post and input shaft, the plurality of spider reaction plates and the plurality of post friction plates positioned in an alternating arrangement; and
a bias member configured to exert a bias force on the alternating arrangement of the plurality of spider reaction plates and plurality of the post friction plates to allow torque transfer between the plurality of spider reaction plates and the plurality of the post friction plates.

20. The vehicle of claim 18, wherein the maximum toque threshold of the PTL varies based on a then current ratio of PTL torque over cam assembly torque.

* * * * *

UNITED STATES PATENT AND TRADEMARK OFFICE
CERTIFICATE OF CORRECTION

PATENT NO. : 11,994,213 B2
APPLICATION NO. : 18/178359
DATED : May 28, 2024
INVENTOR(S) : Molde et al.

It is certified that error appears in the above-identified patent and that said Letters Patent is hereby corrected as shown below:

On the Title Page

Item (57) Line 10 of ABSTRACT, please replace "toque" with --torque-- between "maximum" and "threshold".

In the Claims

Column 9, Line 53, Claim 1, please replace "toque" with --torque-- between "maximum" and "threshold".

Column 9, Line 62, Claim 2, please replace "toque" with --torque-- between "amount of" and "and".

Column 10, Line 30, Claim 7, please replace "toque" with --torque-- between "maximum" and "threshold".

Column 10, Line 52, Claim 10, please replace "toque" with --torque-- between "amount of" and "present".

Column 10, Line 61, Claim 10, please replace "toque" with --torque-- between "maximum" and "threshold".

Column 10, Line 62, Claim 10, please replace "toque" with --torque-- between "maximum" and "threshold".

Column 12, Line 8, Claim 18, please replace "toque" with --torque-- between "maximum" and "threshold".

Column 12, Line 13, Claim 18, please replace "toque" with --torque-- between "maximum" and "threshold"."

Signed and Sealed this
Twentieth Day of August, 2024

*Katherine Kelly Vidal*
Katherine Kelly Vidal
*Director of the United States Patent and Trademark Office*

Column 12, Line 21, Claim 18, please replace "toque" with --torque-- between "an amount of" and ".".